United States Patent [19]
Phan et al.

[11] Patent Number: 5,969,032
[45] Date of Patent: Oct. 19, 1999

[54] LATEX BINDERS FOR COATINGS INCORPORATING A POLYMERIZABLE SURFACTANT HAVING A TERMINAL ALLYL AMINE MOIETY

[75] Inventors: Lien Phan, Mississauga; Rajeev Farwaha, Brampton, both of Canada

[73] Assignee: National Starch and Chemical Investment Holding Corporation, Wilmington, Del.

[21] Appl. No.: 09/036,825

[22] Filed: Mar. 9, 1998

[51] Int. Cl.⁶ .............................. C08F 2/22; C08L 09/10
[52] U.S. Cl. .................... 524/460; 524/457; 528/373; 528/388; 528/391; 528/398
[58] Field of Search .................... 528/373, 388, 528/391, 398; 524/457, 460

[56] References Cited

U.S. PATENT DOCUMENTS 4,293,476 10/1981 Moore et al. ...................... 260/29.7 W
4,414,354 11/1983 Slocombe ................................ 524/460

OTHER PUBLICATIONS

Leary, B. and Lyons C.J., "A Novel Composite Polymer Latex Technology", *Aust. J. Chem.*, 1989, 42, pp. 2055–2070.

Piirma, I., "Polymeric Surfactants in Emulsion Polymerization", *Makromol. Chem.*, Macromol. Symp. 35/36, pp. 467–475 (1990).

Holmberg, K., "Polymerizable Surfactants", *Progress in Organic Coatings*, 20 (1992 pp. 325–337.

Antoniett, M. and Iientze, H.–P., "Microemulsion Polymerization: New Surfactant Systems by Counterion Variation", *Advanced Materials*, 1996, 8, No. 10.

*Primary Examiner*—Duc Truong
*Attorney, Agent, or Firm*—John D. Thallemer

[57] ABSTRACT

The invention relates to an emulsion polymerization process for preparing a latex binder for use in paint. The process involves reacting a water-soluble or water-dispersible polymerizable surfactant having a terminal allyl amine moiety with at least one ethylenically unsaturated monomer and ionic monomer at a pH from about 2 to about 7. Significantly lower levels of the polymerizable surfactants are required to control the latex particle size and to stabilize the latex particles at high solids content as compared to the amount of conventional anionic surfactants used to stabilize a latex.

26 Claims, No Drawings

LATEX BINDERS FOR COATINGS INCORPORATING A POLYMERIZABLE SURFACTANT HAVING A TERMINAL ALLYL AMINE MOIETY

FIELD OF THE INVENTION

The invention relates to latex binders for use in coating compositions. The latex binders are prepared by reacting an ethylenically unsaturated monomer and an ionic monomer with a water-soluble or water-dispersible polymerizable surfactant having a terminal allyl amine moiety.

BACKGROUND OF THE INVENTION

Latex paints employ latex binders as film formers, pigment binders, fillers and the like. Latex binders are typically comprised of emulsion polymers. The properties that are desirable in latex binders used in paints are, uniform particle size, excellent mechanical stability (especially at high shear) and no coagulum. Additionally, the latex should dry to a clear, glossy and water resistant film. The properties that are desirable in latex-based coating compositions are freeze-thaw stability, good gloss, superior abrasion resistance, good block resistance, controlled drying time and good rheology.

Conventional anionic sufactants have been used to control the latex particle size and to stabilize the latexes at high solid contents. However, such anionic surfactants are not covalently bound to the polymer particles. Under high shear or under a few cycles of freeze-thaw tests, the anionic surfactants can be desorbed and their stabilizing properties in a latex system are lost. Moreover, such conventional surfactants are required to be present in an amount of at least about 3 pphm in the polymerization of the latex which has an adverse effect on the water resistance of the coating prepared using the latex due to the hydrophilicity imparted by the surfactant, and the unbound surfactant has a tendency to migrate to the surface of the coating in order to lower the surface tension.

An article in Advanced Materials, entitled "Microemulsion Polymerization: New Surfactant Systems by Counterion Variation", Vol. 8, No. 10, pp. 840–844 (1996), describes adjusting the geometry and polarity of a given surfactant by electrostatic coupling with the appropriate organic counter-ion, such as the generation of a very bulky, hydrophobic head group. Selected modifications of two standard surfactants, dodecyl sulfate and cetyl trimethylammonium ions were described. The process was micromulsion polymerization process.

An article in Progress in Organic Coatings entitled, "Polymerizable Surfactants", Vol. 20, pp. 325–337 (1992), describes the design of polymerizable surfactants and demonstrate their applicability in selected applications, such as alkyd emulsions, micro-emulsions of alkyds, emulsion polymerization and surface modification. Surface modification includes the polymerization of a monolayer adsorbed from aqueous solution and the crosslinking surfactants that have migrated to the surface.

An article in Macromolecular Chemistry, Macromolecular Symposium entitled, "Polymeric Surfactants in Emulsion Polymerization", Vol. 35/36, pp. 467–475 (1990), describes the stabilizing efficiency of a variety of amphipathic copolymers in aqueous emulsion polymerizations of styrene, methyl methacrylate and acrylonitrile. Using the number and the size of the particles as the criterion of stability, it was determined that the availability for anchoring of the backbone in the amphipathic graft copolymers was crucial for stability. A change in the backbone chain length with the same percent hydrophilic grafts was determined to have no effect on the outcome of the reaction.

An article in the Australia Journal of Chemistry entitled, "A Novel Composite Polymer Latex Technology", Vol. 42, pp. 2055–70 (1989) describes a polymerization process for preparing a latex wherein each particle contains a blend of two or more copolymers. The particles are sterically stabilized by a non-ionic reactive surfactant. The latex is prepared by suspension polymerization.

SUMMARY OF THE INVENTION

Accordingly, it is an object of the present invention to provide a polymerization process for preparing a latex.

It is also an object of the invention to provide a stable latex for use as a binder in paint formulations.

It is another object of the invention to provide a latex binder that exhibits excellent mechanical stability.

It is a further object of the invention to provide a latex binder which when formulated into a coating composition exhibits water-resistance.

With regard to the foregoing and other objects, the present invention provides an improved emulsion polymerization process for preparing a latex binder for use in paint, the improvement comprising reacting a water-soluble or water-dispersible polymerizable surfactant having a terminal allyl amine moiety with at least one ethylenically unsaturated monomer and ionic monomer, wherein the polymerization is conducted at a pH from about 2 to about 7, and the polymerizable surfactant is present in an amount of from about 0.1 to about 5 weight percent, based on the total weight of ethylenically unsaturated monomer, and the ionic monomer is present in a sufficient amount to impart mechanical stability to the latex binder.

In a preferred embodiment, the polymerizable surfactant is an allyl amine salt of alkyl benzene sulfonate having the structure

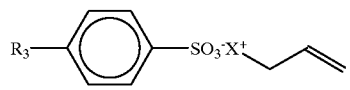

wherein $R_3$ is an alkyl group having 1 to 20 carbon atoms, and X+ is selected from the group consisting of $NH_3^+$, $NH_2R_5$ and $NR_6R_7$ wherein $R_6$ and $R_7$ are independently $C_1$–$C_4$ alkyl or hydroxyalkyl groups.

In another preferred embodiment, the polymerizable surfactant is an allyl amine salt of alkyl ether sulfate having the structure

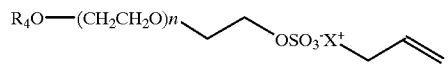

wherein $R_4$ is an alkyl group having 1 to 20 carbon atoms; n is an integer from 2 to 15; and $X^+$ is defined as above.

In an additional preferred embodiment, the polymerizable surfactant is an allyl amine salt of a phosphate ester having the structure

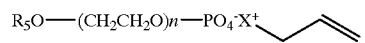

wherein $R_5$ is an alkyl group having 1 to 20 carbon atoms, and n and $X^+$ are defined as above.

According to another aspect, the invention provides a paint composition having improved water resistance and having present therein a latex binder comprising an emulsion polymerization product obtained by reacting a water-soluble or water-dispersible polymerizable surfactant having a terminal allyl amine moiety with at least one ethylenically unsaturated monomer and ionic monomer, wherein the polymerization is conducted at a pH from about 2 to about 7, and the polymerizable surfactant is present in an amount of from about 0.1 to about 5 weight percent, based on the total weight of ethylenically unsaturated monomer, and the ionic monomer is present in a sufficient amount to impart mechanical stability to the latex binder.

Significantly lower levels of the polymerizable surfactants are required to control the latex particle size and to stabilize the latex particles at high solids content as compared to the amount of conventional anionic surfactants used to stabilize a latex. In addition, the latex binders prepared using the polymerizable surfactants demonstrate significant improvement in water resistance as compared to that of latex stabilized by conventional anionic or nonionic surfactant.

The latex binders prepared using the polymerizable surfactants, of the invention exhibit excellent stability and the coating compositions prepared with these latex binders have superior coating properties compared to compositions prepared with latex binders stabilized by conventional anionic surfactant or alkyl phenol ethoxylate surfactant. The water-soluble polymerizable surfactants stabilized in these latex binders impart excellent stability during polymerization, without generating coagulum.

DESCRIPTION OF THE INVENTION

The latex binders of the present invention are prepared from an aqueous emulsion polymer. The polymer is prepared from the reaction product of at least one ethylenically unsaturated monomer, an ionic monomer and a polymerizable surfactant having a terminal allyl amine moiety.

The ethylenically unsaturated monomer is selected from anhydrides, vinyl esters, alpha-olefins, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, and vinyl amide monomers. As used herein, "ethylenically unsaturated monomer" does not include ionic monomers. A combination of ethylenically unsaturated monomers may also be used.

Suitable anhydride monomers are, for example, maleic anhydride and itaconic anhydride. Suitable vinyl esters are, for example, vinyl acetate, vinyl formate, vinyl propionate, vinyl butyrate, vinyl isobutyrate, vinyl valerate, vinyl 2-ethyl-hexanoate, vinyl isooctanoate, vinyl nonanoate, vinyl decanoaite, vinyl pivalate, and vinyl versatate. Suitable alkyl esters of acrylic and methacrylic acid are, for example, methyl acrylate, methyl methacrylate, ethyl acrylate, ethyl methacrylate, propyl acrylate, butyl acrylate, pentyl acrylate, hexyl acrylate, and 2-ethyl hexyl acrylate, etc. Suitable substituted or unsubstituted mono and dialkyl esters of unsaturated dicarboxylic acids are, for example, substituted and unsubstituted mono and dibutyl, mono and diethyl maleate esters as well as the corresponding fumarates. Suitable vinyl aromatic monomers preferably contain from 8 to 20 carbon atoms, most preferably from 8 to 14 carbon atoms. Examples of vinyl aromatic monomers are styrene, 1-vinyl napthalene, 2-vinyl napthalene, 3-methyl styrene, 4-propyl styrene, t-butyl styrene, 4-cyclohexyl styrene, 4-dodecyl styrene, 2-ethyl-4-benzyl styrene, 4-(phenylbutyl)styrene, 3-isopropenyl-α, α-dimethylbenzyl isocyanate, and halogenated styrenes.

Suitable acrylamide based monomers are, for example, acrylamide, N,N-dimethylacrylamide, N-octyl acrylamide, N-methylol acrylamide, dimethylaminoethylacrylate, etc. Suitable cyclic monomers are, for example, vinyl pyrrolidone, vinyl imidazolidone, vinyl pyridine, etc. Suitable sulfonated monomers are, for example, 2-acrylamido-2-methyl propane sulfonic acid, sodium methallyl sufonate, sodium vinyl sulfonate, sulfonated sytrene, etc. Suitable vinyl amide monomers are, for example, N-vinyl formamide N-vinyl acetamide, etc.

In a preferred embodiment of the invention, the ethylenically unsaturated monomer is an alkyl acrylate monomer having the formula:

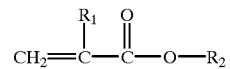

In the above formula $R_1$ is hydrogen or methyl and $R_2$ is an alkyl group having from 1 to 10 carbon atoms. The alkyl groups in the alkyl acrylate monomers can be straight chained or branched. The ethylenically unsaturated monomer is preferably selected from methyl methacrylate, butyl acrylate, styrene and combinations thereof.

Suitable ionic monomers include, for example, α,β-ethylenically unsaturated $C_3$–$C_8$ monocarboxylic acids, α,β-ethylenically unsaturated $C_4$–$C_8$ dicarboxylic acids, including the anhydrides thereof, and the $C_4$–$C_8$ alkyl half esters of the α,β-ethylenically unsaturated $C_4$–$C_8$ dicarboxylic acids. A combination of ionic monomers may also be used. Preferred ionic monomers are acrylamido methyl propane, sulfonic acid, styrene sulfonate, sodium vinyl sulfonate, acrylic acid, methacrylic acid, and the $C_4$–$C_8$ alkyl half esters of maleic acid, maleic anhydride, fumaric acid, and itaconic acid. Most preferably, the ionic monomer is acrylic acid or methacrylic acid.

The ionic monomer is preferably present in an amount of from about 0.01 to about 10 weight percent, more preferably from about 0.1 to about 5 weight percent, based on the total amount of ethylenically unsaturated monomer. Most preferably, the ionic monomer is present in an amount of from about 0.5 to about 3 weight percent, based on the total amount of ethylenically unsaturated monomer.

In one embodiment, the polymer may be prepared with a wet adhesion monomer. Preferably, the wet adhesion monomer is present in an amount up to about 2 weight percent, based on the total amount of ethylenically unsaturated monomer. Wet adhesion monomers are known in the art and are selected from, for example, aminoethyl acrylate and methacrylate, dimethylaminopropylacrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl)acrylamide and methacry lamide, N(3-dimethylamino-2,2-dimethylpropyl) acrylamide and methacrylamide, N-dimethylaminomethyl acrylamide and methacrylamide, N-(4-morpholino-methyl) acrylamide and methacrylamide, vinylimidazole, vinylpyrroliddne, N-(2-methacryloyloxyethyl)ethylene urea, N-(2-methacryloxyacetamidoethyl)-N, allylalkyl ethylene urea, N-methacrylamidomethyl urea, N-methacryloyl urea, 2-(1-imidazolyl)ethyl methacrylate, 2-(1-imidazolidin-2-on)ethylmethacrylate, N-(methacrylamido)ethyl urea and allyl ureido wet adhesion monomer. Combinations of wet adhesion monomers may also be used.

The polymerizable surfactant is a water-soluble or water-dispersible surfactant having a hydrophilic and hydrophobic portion. The hydrophilic portion is selected from a sulfonate allyl amine moiety, a sulfate allyl amine moiety, and a phosphate allyl amine moiety. The hydrophobic portion is selected from either an alkyl group having 1 to 20 carbon atoms, preferably 10 to 18 carbon atoms, or a group having the structure RO—$(CH_2CH_2O)n$—, wherein R is an alkyl group having 1 to 20 carbon atoms, preferably 10 to 18 carbon atoms, and n is an integer from 2 to 15. The hydrophilic portion and the hydrophobic portion are connected by means of a covalent bond. Combinations of such surfactants may also be used in preparing the polymer of the invention.

A preferred polymerizable surfactant having a terminal allyl amine moiety is an allyl amine salt of alkyl benzene sulfonate denoted Structure I:

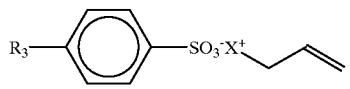

In Structure I, $R_3$ is an alkyl group having 1 to 20 carbon atoms, preferably 10 to 18 carbon atoms; and X+ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl benzene sulfonate is allyl amine salt of dodecylbenzene sulfonate.

Another preferred polymerizable surfactant having a terminal allyl amine moiety is an allyl amine salt of alkyl ether sulfate denoted Structure II:

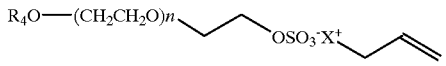

In Structure II, $R_4$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl ether sulfate is allyl amine salt of laureth sulfate.

Another preferred polymerizable surfactant having a terminal allyl amine moiety is an allyl amine salt of a phosphate ester denoted Structure III:

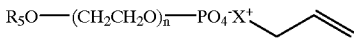

In Structure III, $R_5$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl hydroxyalkyl groups. Most preferably, the allyl amine salt of a phosphate ester is allyl amine salt of nonyl phenol ethoxylate (9 moles EO) phosphate ester. Preferred polymerizable surfactants having terminal amine moieties are available under the trademarks POLYSTEP AU1, POLYSTEP AU7 and POLYSTEP AU9 from Stepan Company.

The polymerizable surfactant is present in the aqueous emulsion in an amount of from about 0.1 to about 5 weight percent based on the total weight of ethylenically unsaturated monomer. Preferably, the polymarizable surfactant is present in an amount of from about 0.5 to about 3 weight percent based on the total weight of ethylenically unsaturated monomer in the aqueous emulsion.

The aqueous emulsion may also include one or more surfactants or emulsifiers which are not polymerizable such as anionic and/or nonionic surfactants. Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols. Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

The aqueous emulsion polymer is prepared using free radical emulsion polymerization techniques. The aqueous emulsion polymer may be prepared by emulsion polymerization methods which are known in the art and include batch or continuous monomer addition or incremental monomer addition processes. As used herein, "batch" refers to a process whereby the entire amount of monomer is added in a single charge. As used herein, "continuous monomer addition" and "incremental monomer addition" refer to a process wherein optionally a minor portion of the monomer (s) is initially charged in the reactor and the remainder of the monomer(s) is then added gradually over the course of the reaction. The entire amount of the aqueous medium with polymerization additives can be present in the polymerization vessels before introduction of the monomer(s), or alternatively a portion of it can be added continuously or incrementally during the course of the polymerization.

Essentially any type of free radical generator can be used to initiate the free radical emulsion polymerization. For example, free radical generating chemical compounds, ultraviolet light or radiation can be used. The choice of free radical generating chemical compound depends on the desired polymerization rate and final polymer properties.

Some representative examples of free radical initiators which are commonly used include the various persulfates, percarbonates, perborates, peroxides, azo compounds, and alkyl perketals. Examples of free radical initiators are potassium persulfate, ammonium persulfate, sodium persulfate, benzoyl peroxide, hydrogen peroxide, di-t-butyl peroxide, dicumyl peroxide, caproyl peroxide, 2,4-dichlorobenzoyl perooxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, 2,2'azobis(N,N'dimethyleneisobutyrzimidine) dihydrochloride, 2,2'azobis(2-amidinopropane) dihydrochloride, 2,2'-azobis(N,N'-dimethyleneisobutyramidine), 4,4'-azobis(4-cyanopentanoic acid), 2,2'-azobis{2-methyl-N-[1,1-bis(hydroxymethyl)-2hydroxyethyl]propionamide), 2,2'-azobis[2-methyl-N-(2-hydroxyethyl)propionamide], 2,2'-azobis(isobutyramide) dihydrate, 2,2-bis-(t-butylperoxy)butane, ethyl 3,3-bis(t-butylperoxy)butyrate, and 1,1-di-(t-butylperoxy) cycloyhexane. Any combination of free radical initiators may be used to prepare the polymers of the invention.

The amount of free radical initiator employed will vary with the desired molecular weight of the polymer being synthesized. Higher molecular weights are achieved by utilizing smaller quantities of the initiator and lower molecular weights are attained by employing larger quantities of the initiator. However, as a general rule from about 0.005 to about 10 weight percent, preferably from about 0.1 to about 3 weight percent, based on total weight of ethylenically unsaturated monomer, of a free radical initiator will be included in the reaction mixture.

The polymerization is preferably conducted at a temperature which is within the range of about 30° C. to about 95° C. More preferably, the polymerization is conducted at a temperature which is with the range of about 60° C. to about 85° C.

The polymerization is carried out at a pH of about 2 to about 7, preferably at a pH of about 3 to about 6. More preferably, the polymerization is conducted at a pH of from about 3.5 to about 5.5. The pH range is important in order to incorporate, by means of covalent bonding, the polymerizable surfactant onto the polymer particles during polymerization which prevents desorption of the polymerizable surfactant when shear is applied to the latex and produces a more stable latex. In order to maintain the pH range, it may be useful to work in the presence of customary buffer systems, for example, in the presence of alkali metal carbonates, alkali metal acetates, and alkali metal phosphates.

Although the solids content and viscosity of the latex can vary typical total solids content which is defined as the nonvolatile components of the latex is in the range of from about 1 to about 60 weight percent, preferably 40 to 55 weight percent, based on the total weight of the latex.

For various applications, it is sometimes desirable to have small amounts of additives, such as, surfactants, bactericides, pH modifiers, and antifoamers, incorporated in the latex. This may be done in a conventional manner and at any convenient point in the preparation of the latexes.

The emulsion polymerization is generally continued until the residual ethylenically unsaturated monomer content is below about 1%. The latex product is then allowed to cool to about room temperature, while sealed from the atmosphere. A redox scavenger may be added to the polymerization reactor prior to removing the latex in order to react any residual monomer.

The size of the polymer particles can vary. However, for optimum water resistance, it is preferable that the particles have an average diameter of less than 500 nanometers. In case of the polymer of this invent on, the smaller the average particle size, the more water resistant the polymer. Suitable particle sizes generally can be achieved directly from the polymerization. However, screening of the resulting latex to remove particles outside the desired range, and thus narrowing the particle size distribution, may be employed.

Paints may be formulated with the latex binders of the invention using techniques known to those skilled in the art of manufacturing paint. Generally, water, defoamer, stabilizer, pigment, filler and surfactant are combined to form the grind, where the pigments and fillers are ground to a desired particle size as indicated by a Hegman reading of 2 to 3. Additional water, latex binder, rheology modifiers, biocides and the like are added to the grind and the entire batch is blended and adjusted to desired Hegman readings and viscosity.

The latex binders of the present invention offer a number of advantages over known binders. The first advantage is that much lower levels of polymerizable surfactants are required to control the latex particle size and to stabilize the latex particles at high solid contents. The second advantage is that the latex binders of the invention provide excellent mechanical stability compared to that of the known formulations which are stabilized by much higher levels of conventional anionic surfactant or alkylphenol phenol surfactants. The third advantage is that the coating compositions prepared from the latex binders of the invention provide superior water resistance compared to that of styrene-acrylic latexes stabilized by conventional anionic surfactant or alkyl phenol surfactants. The fourth advantage is that the coating compositions prepared from the latex binders have better abrasion resistance compared to that of conventional anionic stabilized latexes. The fifth advantage is that the latex binders of the invention have much higher contact angle than that of a latex binder stabilized by conventional anionic surfactants. Contact angle is a response of a liquid to a solid substrate and determines how well the substrate "wets" or permits a fluid to flow across its surface. The sixth advantage is that the latex binders of the invention exhibit much higher gloss in high gloss paint formulas as compared to that of conventional anionic stabilized latexes. The seventh advantage is that the latex binders of the invention exhibit freeze-thaw stability.

The following test procedures were used to evaluate the latex binders of the invention.

(1) Mechanical Stability Test

A 400 gram sample of the latex binder of the present invention was transferred into a 1600 ml stainless steel beaker. A blade was fixed into a dispersator and the blade was lowered into the latex binder sample so that the blade was close to but not touching the bottom of the beaker. A rheostat which was attached to the dispersator was adjusted so that the shaft of the blade was rotating at 6500 rpm. The speed was confirmed with a Strobe meter. The latex binder sample was agitated at 6500 rpm for 30 minutes. The latex binder sample was monitored for development of coagulum and change in viscosity. The latex binder sample was considered stable if it did not have any coagulum and viscosity changes.

(2) Contact Angle Measurement

A thin layer of the latex emulsion is spread across a clean glass slide and dried at room temperature for 24 hours to form a film. A drop of distilled water is placed on the film and the contact angle is determined by using the contact angle goniometer at 0, 5, 7 and 10 minutes. As used herein, contact angle means a response of a liquid to a solid substrate usually performed to determine how well the substrate wets or permits a fluid to flow across its surface.

(3) Abrasion Resistance (Scrubability) Test ASTM 2486-0

A test panel was prepared by drawing a 7 mil film of paint formulated with the latex binder of the present invention on a LENETA chart and allowing the paint to dry for 7 days in an open room at approximately 23° C. and 50% relative humidity. The dried chart having a film of paint dried thereon was affixed to a glass plate and put into a scrub machine equipped with a scrub brush and a basin for holding the glass plate. The brush was prepared by immersing it overnight in a 2% solution of Triton X-100 surfactant. The brush was placed in the machine holder and the glass plate was put under the brush. The brush bristles were spread evenly with 10 grams of a standardised scrub medium (available from LENTA Co.). The glass plate was wet with 5 ml of water in the path of the brush. The scrub machine was started. After every 800 strokes before failure, 10 grams of scrub medium and 5 ml of water were added to the brush bristles. The number of strokes required for 0.5 inch of black chart to show through the paint was recorded.

(4) Freeze-Thaw Stability Test

A paint sample formulated with the latex binders of the present invention was transferred into a 250 ml stainless steel can and was kept in the freezer for 18 hours at −18° C. The paint sample was removed from the freezer and was allowed to thaw for 24 hours to room temperature. The paint sample was observed for the flow properties, lump formation and coagulation. The paint sample was considered to pass the freeze-thaw stability test if it exhibited no coagulation. This cycle of freezing-thawing was repeated until either the paint sample coagulated or until a total of five cycles were completed with no coagulation. In addition, the initial viscosity was determined and compared to the viscosity after five cycles.

(5) Wet Adhesion Test

A test panel was prepared by drawing a 3 mil film of paint formulated with a latex binder of the present invention on a dried panel precoated with an alkyd paint and allowing it to dry for two days in an open room at approximately 23° C. and 50% relative humidity. The dried test panel was scored by using an Exacto (knife and a ruler). The scored test panel was affixed to a glass plate and put into a scrub machine equipped with a scrub brush and a basin for holding the test panel. Then 250 ml of hot water (approximately at 50° C.) was poured into the basin to cover the test panel for 10 minutes. A hogs hair brush was placed in the machine holder. The scrub machine was started and run for 400 strokes. If the coating remained intact, 8 grams of AJAX which is a dry abrasive and available from Colgate-Palmolive was placed under the brush and the machine run for another 100 strokes. After every 100 strokes before failure, 8 grams of AJAX was added to the brush bristles. The number of strokes to the paint at which 0.5 inch of the chart shows through the test panel was recorded.

(6) Gloss Measurement

A gloss panel was prepared by drawing a 3 mil film of semigloss paint prepared using the latex binder of the present invention on a LENETA PENOPAC chart, form 19BR, and allowing the paint film to dry for either 1 day, 3 days or 7 days in an open room at 23±2° C. and 50±5% relative humidity. After the paint film had been dried for 1 day, the gloss was measured. The gloss measurement was repeated after 3 days and 7 days of drying. The machine that was used to measure gloss is a BYK Gardner micro-TRI gloss meter. Six readings were taken and the average gloss values were recorded.

The following nonlimiting examples illustrate further aspects of the invention.

EXAMPLE 1

Preparation of Comparative Latex Binder C1

A latex was polymerized using a nonpolymerizable anionic surfactant POLYSTEP B-27 according to the following formula:

| Ingredients | Grams | Concentration (pphm) |
| --- | --- | --- |
| Initial Water | 265 | 54.9 |
| Monomer Mixture | | |
| Water | 160.8 | 26.7 |
| POLYSTEP B-27 | 53.6 | 11.1 (or 3 pphm 100% active) |
| Methacrylic acid (MAA) | 4.8 | 1.0 |
| SIPOMER WAM II | 7.3 | 1.5 |
| Methyl methacrylate (MMA) | 260.6 | 54 |
| Butyl acrylate (BA) | 222.0 | 46 |

| Ingredients | Grams | Concentration (pphm) |
| --- | --- | --- |
| Catalyst Solution | | |
| Water | 70 | 14.5 |
| Sodium persulfate | 2.5 | 0.52 |

In a three liter reaction vessel, equipped with a reflux condenser, addition funnels, and stirrer, the Initial Charge of water was added to the reactor with agitation of 100 rpm. The reactor was heated to 78° C. and a 15 gram portion of the Monomer Mixture and 10 grams of the Catalyst Solution were charged to the reactor. After 20 minutes, the remainder of the Monomer Mixture was metered into the reactor over a period of 2 hours. The remainder of the Catalyst Solution was slow added to the reactor over a period of 2.5 hours. The reaction temperature was maintained for an additional 20 minutes, then 0.3 grams of tertiary butyl hydroperoxide in 5 grams of water and 0.3 grams of sodium formaldehyde sulfoxylate were added to the reactor. The polymerization was conducted at a pH of 4.5. The pH of the resulting latex was adjusted to 7.5 by the addition of a 26.6% aqueous ammonium hydroxide solution.

Comparative Latex Binder C1 was determined to have 0.006% coagulum, 49.9% solids, average particle size of 105 nm, and a brookfield viscosity of 68 cps.

EXAMPLE 2

Preparation of Comparative Latex Binder C2

A latex was prepared using the procedure and formula according to Example 1, except that 0.7 pphm of methacrylic acid was used instead of 1 pphm of methacrylic acid. As in Example 1, the pH of the latex was adjusted to 8 by the addition of a 26.6% ammonium hydroxide solution.

Comparative Latex Binder C2 was determined to have 0.2% coagulum, an average particle size of 106 nm, a percent solids of 50.1, and a brookfield viscosity of 72 cps.

EXAMPLE 3

Preparation of Comparative Latex Binder C3

A latex was prepared using the procedure and formula according to Example 1, except that 0.7 pphm of methacrylic acid and 1.5 pphm of POLYSTEP B-27 were used instead of 1 pphm of methacrylic acid and 3 pphm of POLYSTEP B-27. Comparative Latex Binder C3 was not stable and had 15% coagulum. Therefore, no characterization and testing were done.

EXAMPLE 4

Preparation of Latex Binder A1

A latex was prepared using the procedure and formula according to Example 1, except that 1.5 pphm of a polymerizable surfactant having terminal amine moieties (POLYSTEP AU-7 which is allyl amine salt of laureth ether sulfate) and 0.7 pphm of methacrylic acid were used instead of 3 pphm of anionic surfactant POLYSTEP B-27 and 1 pphm of methacrylic acid. The polymerization was conducted at a pH of 3. As in Example 1, the pH of the latex was adjusted to 8 by the addition of a 26.6% ammonium hydroxide solution.

Latex Binder A1 was determined to have 0.004% coagulum, an average particle size of 115 nm, a percent solids of 49.8, and a brookfield viscosity of 70 cps.

EXAMPLE 5

Preparation of Latex Binder A2.

A latex was prepared using the procedure and formula according to Example 4, except that the polymerization was conducted at a ply of 3.5 instead of 3.0. As in Example 4, the pH of the latex was adjusted to 8 by the addition of a 26.6% ammonium hydroxide solution.

Latex Binder A2 was determined to have 0.005% coagulum, an average particle size of 111 nm, a percent solids of 49.5, and a brookfield viscosity of 73.5 cps.

EXAMPLE 6
Preparation of Latex Binder A3

A latex was prepared using the procedure and formula according to Example 4, except that the polymerization was conducted at a pH of 4.5 instead of 3.0. As in Example 4, the pH of the latex was adjusted to 8 by the addition of a 26.6% ammonium hydroxide solution.

Latex Binder A3 was determined to have 0.006% coagulum, an average particle size of 112 nm, a percent solids of 50.1, and a brookfield viscosity of 75 cps.

EXAMPLE 7
Preparation of Latex Binder A4

A latex was prepared using the procedure and formula according to Example 4, except that the polymerization was conducted at a pH of 5.5 instead of 3.0. As in Example 4, the pH of the latex was adjusted to 3 by the addition of 26.6% ammonium hydroxide solution.

Latex Binder A4 was determined to have 0.006% coagulum, an average particle size of 113 nm, percent solids of 50.3, and brookfield viscosity of 120 cps.

EXAMPLE 8
Preparation of Latex Binder A5

A latex was synthesized using the procedure and formula according to Example 4 except that the polymerization was conducted at a pH of 7.5 instead of 3. As in Example 4, the pH of the product was adjusted to 8 by the addition of 26.6% ammonium hydroxide solution.

Latex Binder A5 was determined to have 0.006% coagulum, an average particle size of 107 nm, percent solids of 50.3, and brookfield viscosity of 160 cps.

EXAMPLE 9
Evaluation of Latex Binders in Mechanical Stability Test

Comparative Latex Binders C1 and C2, and Latex Binder; A1–A5 which were prepared in Examples 1–2 and 4–8, respectively, were evaluated for mechanical stability according to the test method described above. The test results are summarized in Table I.

TABLE I

| Latex Binder | C1 | C2 | A1 | A2 | A3 | A4 | A5 |
| --- | --- | --- | --- | --- | --- | --- | --- |
| Mechanical stability test | pass | fail | pass | pass | pass | pass | pass |

The results in Table I clearly show that when a conventional anionic surfactant which is nonpolymerizable is used to prepare a latex binder, the amount of ionic monomer must be at least 1 pphm and the amount of anionic surfactant used must be greater than 1.5 pphm. It is noted that Comparative Latex Binder C1 which passed the mechanical stability test had 1 pphm of ionic monomer and 3 pphm of anionic surfactant. Comparative Latex Binder C2 which failed the mechanical stability test was prepared with 0.7 pphm of ionic monomer and 3 pphm of anionic surfactant. Comparative Latex Binder C3 which could not be tested due to high levels of coagulum was prepared with 0.7 pphm of ionic monomer and 1.5 pphm of anionic surfactant.

In contrast, Latex Binders A1–A5 of the invention were prepared with 0.7 pphm of ionic monomer and 1.5 pphm of a polymerizable surfactant having terminal allyl moieties and all passed the mechanical stability test.

EXAMPLE 10
Evaluation of Latex Binders in Contact Angle Test

Comparative Latex Binders C1 and C2, and Latex Binders A1–A5 which were prepared in Examples 1–2 and 4–8, respectively, were evaluated for contact angle according to the test method described above. The test results are summarized in Table II.

TABLE II

| Latex Binder | C1 | A1 | A2 | A3 | A4 | A5 |
| --- | --- | --- | --- | --- | --- | --- |
| 0 minute | 13 | 32 | 23 | 31 | 27 | 39 |
| 5 minutes | 10 | 27 | 18 | 29 | 25 | 31 |
| 7 minutes | 6 | 27 | 18 | 28 | 25 | 29 |
| 10 minutes | 4 | 25 | 14 | 25 | 22 | 26 |

The test results in Table II show that Latex Binders A1–A5 of the invention which were prepared using a polymerizable surfactant having terminal allyl moieties exhibited greater than 50% higher contact angle measurements even after 10 minutes compared to the contact angle measurement of the latex binder prepared with an anionic surfactant.

EXAMPLE 11
Preparation of Semi-Gloss Paint Formulation

| Ingredients | Pounds per 100 U.S. Gallons |
| --- | --- |
| Propylene Glycol | 40.0 |
| COLLOID 226–35 | 5.5 |
| COLLOID 643 | 6.6 |
| Water | 71.0 |
| TITANIUM 2020 | 300.0 |
| VERWHITE (OMYA 3) | 50.0 |
| Water | 180.6 |
| Disperse 5–6 Hegman | |
| Water | 30.0 |
| CELLOSIZE QP-4400 H | 1.0 |
| REXOL 25/9 | 8.0 |
| TI-PURE | 7.5 |
| ACRYSOL TT-935 | 16.0 |
| AMP-95 | 3.0 |
| COLLOID 643 | 4.0 |
| NUOSEPT 95 | 1.5 |
| Water | 14.0 |
| Latex Binder (45% Solids) | 664.9 |
| | 1403.6 |

PVC—25.0
Weight Solids—51.27%
Volume Solids—36.81%
Pounds per U.S. Gallon—10.87
60° Gloss—40–45
Source
1. COLLOID 226–35 Dispersant is acrylic acid copolymer.
2. COLLOID 643 Defoamer is a mixture of petroleum hydrocarbons and amorphous silica.
3. TITANIUM 2020 is rutile titanium dioxide.
4. VERWHITE is aluminum silicate pigment.
5. CELLOSIZE QP-4400H is a hydroxy ethyl cellulose.
6. REXOL 25/9 is a nonionic nonyl phenol ethoxylate with 9 moles of ethylene oxide.
7. NUOSEPT 95 is a solution of bicyclic oxazolidines, used as preservative.
8. Hegman is a unit of grind used in the industry.

9. ACRYSOL TT-935 is an acrylic polymer associative thickener.
10. AMP-95 is a 2-amino-2-methyl-1-propanol containing 5% water, is a multifunctional additive.

EXAMPLE 12

Evaluation of Latex Binders in Semi-Gloss Paint Formulation

Comparative Latex Binder C1 and Latex Binders A1–A5 which were prepared in Examples 1 and 4–8, respectively, were evaluated for abrasion resistance, wet adhesion, gloss, and freeze-thaw stability in the semi-gloss paint formulation set forth in Example 11. The test results are summarized in Table III.

TABLE III

| Latex Binder | C1 | A1 | A2 | A3 | A4 | A6 |
|---|---|---|---|---|---|---|
| Freeze-thaw Stability Test | passed 5 cycles | passed 5 cycles | passed 5 cycles | passed 5 cycles | passed 5 cycles | passed 5 cycles |
| Viscosity change after 5 cycles of freeze-thaw | 5 KU | 13 KU | 5 KU | 0 KU | 0 KU | 0 KU |
| Abrasion resistance (strokes to failure) | 1612 | 2620 | 2498 | 2804 | 2500 | 1600 |
| Wet adhesion (strokes to failure) | 3400 | 4200 | 4300 | 4400 | 4300 | 4300 |
| Gloss 20°/60° | 8.7/40.7 | 8.4/40.0 | 8.8/41.2 | 7.9/38.5 | 7.8/38.4 | 7.9/39.2 |

The results in Table III show that Latex Binders A1–A4 of the invention exhibited a 50% to 70% improvement in performance properties as compared to Comparative Latex Binder C1 and Latex Binder A5 which was polymerized at pH of 7.5. For example, Latex Binder A1 which was polymerized at pH 3 exhibited 60% increase in abrasion resistance compared to Latex Binder C1. Latex Binder A2, polymerized at pH of 3.5 showed an increase of 50% in abrasion resistance compared to Comparative latex Binder C1. Latex Binder A3, polymerized at pH of 4.5 showed a 70% increase in abrasion resistance compared to Comparative Latex Binder C1. Latex Binder A4, polymerized at pH of 5.5 showed a 55% increase in abrasion resistance compared to Comparative Latex Binder C1.

The test results in Table III also show that when the polymerization was conducted at a pH of greater than 5.5, the resulting latex binder exhibited comparable abrasion resistance to the Comparative Latex Binder C1. In addition, the test results in Table III show that Latex Binders A1–A5 exhibited 20% to 30% increase in wet adhesion properties compared to Comparative Latex Binder C1.

EXAMPLE 13

Preparation of Comparative Latex Binder C4

A latex was prepared using the procedure and formula according to Example 1, except that 2 pphm of methacrylic acid was used instead of 0.7 pphm methacrylic acid and 60 pphm of methylmethacrylate and 40 pphm of butyl acrylate were used instead of 54 pphm of methylmethacrylate and 46 pphm of butyl acrylate. As in Example 1, the pH of the latex was adjusted to 8 by the addition of 26.6% ammonium hydroxide solution.

Comparative Latex Binder C4 was determined to have 0.1% coagulum, an average particle size of 91 nm, percent solids of 49.7, and a brookfield viscosity of 578 cps.

EXAMPLE 14

Preparation of Latex Binder A6.

A latex was prepared using the procedure and formula according to Example 4, except that 2 pphm of methacrylic acid was used instead of 0.7 pphm of methacrylic acid. As in Example 4, the pH of the latex was adjusted to 8 by the addition of 26.6% ammonium hydroxide solution.

Latex Binder A6 was determined to have 0.006% coagulum, an average particle size of 98 nm, percent solids of 49.6, and a brookfield viscosity of 636 cps.

EXAMPLE 15

Preparation of a High Gloss Paint Formula

| HIGH-GLOSS PAINT FORMULA | |
|---|---|
| Ingredient | Pounds per 100 U.S. Gallon |
| Water | 28.0 |
| Propylene Glycol | 20.0 |
| TAMOL 731A | 8.1 |
| BYK 022 | 1.0 |
| TI-PURE R-700 | 200.0 |
| Disperse 7–8 Hegman | |
| Water | 23.9 |
| RESYN (50% Solids) | 504.0 |
| Water | 25.0 |
| Butyl carbitol | 10.0 |
| TEXANOL | 29.9 |
| Propylene glycol | 20.0 |
| BYK 022 | 1.0 |
| ACRYSOL RM-2020 | 27.0 |
| Water | 118.5 |
| Total | 1016.4 |

PVC - 18.84%
Weight Solids - 45.4%
Volume Solids - 32.69%
Pounds per U.S. Gallon - 10.17
60E Gloss - 81

Source

1. Propylene glycol is an anti-freeze agent available from ARCO Chemical.
2. TAMOL 731 is a dispersant available from Rohm and Haas
3. BYK 022 Defoamer is a proprietary mixture available from BYK CHEMIE.
4. TI-PURE R-700 is titanium dioxide available from Dupont.
5. Butyl carbitol is Diethylene Glycol Monobutyl ether available from Union Carbide.
6. TEXANOL ester-alcohol is 2,2,4-trimethyl 1,3-pentanediol monoisobutyrate available from Eastman Chemical Company.
7. ACRYSOL 2020 is the polyurethane rheology modifier available from Rohm and Haas.
8. Hegman is a unit of grind used in the industry.

EXAMPLE 16

Evaluation of Latex Binders in High Gloss Paint Formulation

Comparative Latex Binder C4 and Latex Binder A6 were formulated in the high gloss paint formulation as set forth in Example 15 and evaluated for gloss. The test results are summarized in Table IV.

TABLE IV

| Latex Binder Gloss 20°/60° | C4 | A6 |
|---|---|---|
| 1 day | 26.8/69.7 | 55.4/81.7 |
| 4 days | 24.3/65.5 | 54.3/81.8 |
| 7 days | 22.6/61.7 | 55.4/81.7 |

The test results in table IV clearly show that Latex Binder A6 of the invention exhibited exceptionally high gloss in paint as compared to Comparative Latex Binder C4 which was prepared using a conventional surfactant. The test results also show that the gloss measurements for Latex Binder A6 were unchanged even after 7 days of drying.

The latex binders prepared with the polymerizable surfactants having terminal allyl amine moieties exhibit exceptional gloss in high-gloss paint applications. Also, the latex binders according to the invention withstand repeated cycles of freezing/thawing. Paint prepared from these latexes stabilized by water-soluble polymerizable surfactants provide superior abrasion resistance.

In addition, the latex binders according to the invention have good rheological behaviour (levelling, brush drag, thixotropy). These properties are important in the applications of paint. Also, the latex emulsions stabilized by the water-soluble polymerizable surfactants, under the above mentioned polymerization pH conditions, provide no free surfactant, which gives a superior water resistance property while maintaining excellent shear stability in coating applications.

While the invention has been described in particular reference to certain embodiments thereof, it will be understood that changes and modifications may be made by those of ordinary skill in the art within the scope and spirit of the following claims.

What is claimed is:

1. An improved emulsion polymerization process for preparing a latex binder for use in paint, the improvement comprising reacting a water-soluble or water-dispersible polymerizable surfactant having a terminal allyl amine moiety with at least one ethylenically unsaturated monomer and ionic monomer, wherein the polymerization is conducted at a pH from about 2 to about 7, and the polymerizable surfactant is present in an amount of from about 0.1 to about 5 weight percent, based on the total weight of ethylenically unsaturated monomer, and the ionic monomer is present in a sufficient amount to impart mechanical stability to the latex binder.

2. A latex binder for use in paints comprising an emulsion polymerization product obtained by reacting a water-soluble or water-dispersible polymerizable surfactant having a terminal allyl amine moiety with at least one ethylenically unsaturated monomer and ionic monomer, wherein the polymerization is conducted at a pH from about 2 to about 7, and the polymerizable surfactant is present in an amount of from about 0.1 to about 5 weight percent, based on the total weight of ethylenically unsaturated monomer, and the ionic monomer is present in a sufficient amount to impart mechanical stability to the latex binder.

3. The process according to claim 1 wherein the polymerizable surfactant is an allyl amine salt of alkyl benzene sulfonate having the structure

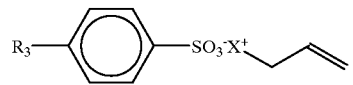

wherein $R_3$ is an alkyl group having 1 to 20 carbon atoms, and X+ is selected from the group consisting of $NH_3^+$, $NH_2R_6$ and $NR_6R_7$ wherein $R_6$ and $R_7$ are independently $C_1$–$C_4$ alkyl or hydroxyalkyl groups.

4. The process according to claim 3 wherein the allyl amine salt of alkyl benzene sulfonate is allyl amine salt of dodecylbenzene sulfonate.

5. The process according to claim 1 wherein the polymerizable surfactant is an allyl amine salt of alkyl ether sulfate having the structure

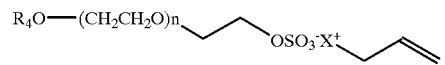

wherein $R_4$ is an alkyl group having 1 to 20 carbon atoms; n is an integer from 2 to 15; and $X^+$ is selected from the group consisting of $NH_3^+$, $NH_2R_6$ and $NR_6R_7$ wherein $R_6$ and $R_7$ are independently $C_1$–$C_4$ alkyl or hydroxyalkyl groups.

6. The process according to claim 5 wherein the allyl amine salt of alkyl ether sulfate is allyl amine salt of laureth sulfate.

7. The process according to claim 1 wherein the polymerizable surfactant is an allyl amine salt of a phosphate ester having the structure

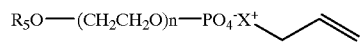

wherein $R_5$ is an alkyl group having 1 to 20 carbon atoms; n is an integer from 2 to 15; and $X^+$ is selected from the group consisting of $NH_3^-$, $NH_2R_6$ and $NR_6R_7$ wherein $R_6$ and $R_7$ are independently $C_1$–$C_4$ alkyl or hydroxyalkyl groups.

8. The process according to claim 7 wherein the allyl amine salt of a phosphate ester is allyl amine salt of nonyl phenol ethoxylate (9 moles EO) phosphate ester.

9. The process according to claim 1 wherein the polymerizable surfactant is present in an amount of from about 1 to about 3 weight percent, based on the total weight of ethylenically unsaturated monomer.

10. The process according to claim 1 wherein the ionic monomer is selected from the group consisting of α,β-ethylenically unsaturated $C_3$–$C_8$ monocarboxylic acids, α,β-ethylenically unsaturated $C_4$–$C_8$ dicarboxylic acids and the anhydrides thereof, $C_4$–$C_8$ alkyl half esters of the α,β-ethylenically unsaturated $C_4$–$C_8$ dicarboxylic acids, and combinations thereof.

11. The process according to claim 10 wherein the ionic monomer is selected from the group consisting of acrylamido methyl propane, sulfonic acid, styrene sulfonate, sodium vinyl sulfonate, acrylic acid, methacrylic acid, and the $C_4$–$C_8$ alkyl half esters of maleic acid, maleic anhydride, fumaric acid and itaconic acid.

12. The process according to claim 11 wherein the ionic monomer is selected from the group consisting acrylic acid and methacrylic acid.

13. The process according to claim 1 wherein the ionic monomer is present in an amount of from about 0.01 to about 10 weight percent, based on the amount of ethylenically unsaturated monomer.

14. The process according to claim 13 wherein the ionic monomer is present in an amount of from about 0.1 to about 5 weight percent, based on the amount of ethylenically unsaturated monomer.

15. The process according to claim 14 wherein the ionic monomer is present in an amount of from about 0.5 to about 3 weight percent, based on the amount of ethylenically unsaturated monomer.

16. The process according to claim 1 wherein the ethylenically unsaturated monomer is selected from the group consisting of vinyl esters, α-olefins, anhydrides, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, vinyl amide monomers, and combinations thereof.

17. The process according to claim 16 wherein the vinyl esters are selected from the group consisting of vinyl acetate, vinyl formate, vinyl propionate, vinyl butyrate, vinyl isobutyrate, vinyl valerate, vinyl 2-ethyl-hexanoate, vinyl isooctanoate, vinyl nonanoate, vinyl decanoate, vinyl pivalate, and vinyl versatate.

18. The process according to claim 16 wherein the alkyl esters are selected from the group consisting of methyl acrylate, methyl methacrylate, ethyl acrylate, ethyl methacrylate, propyl acrylate, butyl acrylate, pentyl acrylate, hexyl acrylate, and 2-ethyl hexyl acrylate.

19. The process according to claim 16 wherein the substituted or unsubstituted mono and dialkyl esters of unsaturated dicarboxylic acids are selected from the group consisting of substituted and unsubstituted mono and dibutyl, mono and diethyl maleate esters, and the corresponding fumarates of such esters.

20. The process according to claim 16 wherein the vinyl amide monomers are selected from the group consisting of N-vinyl formamide and N-vinyl acetamide.

21. The process according to claim 16 wherein the vinyl aromatic monomer is selected from the group consisting of styrene, 1-vinyl napthalene, 2-vinyl napthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene.

22. The process according to claim 1 wherein the ethylenically unsaturated monomer is selected from the group consisting of styrene, methyl methacrylate, butyl acrylate, and combinations thereof.

23. The process according to claim 1 wherein the polymerization is conducted at a pH from about 3 to about 6.

24. The process according to claim 23 wherein the polymerization is conducted at a pH from about 3.5 to about 5.5.

25. A paint composition having improved water resistance and having present therein a latex binder comprising an emulsion polymerization product obtained by reacting a water-soluble or water-dispersible polymerizable surfactant having a terminal allyl amine moiety with at least one ethylenically unsaturated monomer and ionic monomer, wherein the polymerization is conducted at a pH from about 2 to about 7, and the polymerizable surfactant is present in an amount of from about 0.1 to about 5 weight percent, based on the total weight of ethylenically unsaturated monomer, and the ionic monomer is present in a sufficient amount to impart mechanical stability to the latex binder.

26. The composition according to claim 25 further comprising less than 2 weight percent, based on the total weight of ethylenically unsaturated monomer, of a wet adhesion monomer.

* * * * *